(12) United States Patent
Patscheider et al.

(10) Patent No.: US 12,738,585 B2
(45) Date of Patent: Sep. 15, 2026

(54) ENERGY STORAGE FLOOR ASSEMBLY FOR A MOTOR VEHICLE, IN PARTICULAR FOR A PASSENGER CAR, AND MOTOR VEHICLE

(71) Applicant: Bayerische Motoren Werke Aktiengesellschaft, Munich (DE)

(72) Inventors: Julian Patscheider, Munich (DE); Andreas Schleicher, Erdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 309 days.

(21) Appl. No.: 18/692,881

(22) PCT Filed: Oct. 26, 2022

(86) PCT No.: PCT/EP2022/079853
§ 371 (c)(1),
(2) Date: Mar. 18, 2024

(87) PCT Pub. No.: WO2023/094095
PCT Pub. Date: Jun. 1, 2023

(65) Prior Publication Data

US 2024/0429529 A1 Dec. 26, 2024

(30) Foreign Application Priority Data

Nov. 25, 2021 (DE) ..................... 10 2021 130 972.7

(51) Int. Cl.
*H01M 50/249* (2021.01)
*B60K 1/04* (2019.01)
*H01M 50/209* (2021.01)

(52) U.S. Cl.
CPC ............. *H01M 50/249* (2021.01); *B60K 1/04* (2013.01); *H01M 50/209* (2021.01); *B60K 2001/0438* (2013.01)

(58) Field of Classification Search
CPC ............................................. B60K 2001/0438
See application file for complete search history.

(56) References Cited

U.S. PATENT DOCUMENTS

2019/0074497 A1* 3/2019 Haeusler ............. H01M 10/613
2021/0257691 A1* 8/2021 Einoegg .............. H01M 10/625
(Continued)

FOREIGN PATENT DOCUMENTS

DE 10 2016 212 273 A1 1/2018
DE 10 2018 132 255 A1 6/2020
(Continued)

OTHER PUBLICATIONS

International Search Report (PCT/ISA/210) issued in PCT Application No. PCT/EP2022/079853 dated Jun. 9, 2023 with English translation (6 pages).
(Continued)

*Primary Examiner* — Erez Gurari
(74) *Attorney, Agent, or Firm* — Crowell & Moring LLP

(57) ABSTRACT

An energy storage floor assembly for a motor vehicle has a floor structure, which includes longitudinal members and crossmembers connected to one another as carrier elements, and has an electrical energy store, which is arranged on the bottom side of the floor structure, is connected to the floor structure, and has a storage housing with a housing top part, by way of which at least one intermediate space between at least two of the carrier elements is overlapped at the bottom in the vehicle vertical direction and as a result is closed. Prismatic storage cells are arranged in the storage housing. First ones of the storage cells are arranged in succession along a first stacking direction so as to form a first cell module. Second ones of the prismatic storage cells are arranged in succession along a second stacking direction so as to form a second cell module. The cell modules are arranged next to one another and joined to one another. The (Continued)

first and second storage cells are joined to the housing top part.

10 Claims, 3 Drawing Sheets

(56) References Cited

U.S. PATENT DOCUMENTS

2022/0017152 A1 1/2022 Kecalevic et al.
2022/0059894 A1* 2/2022 Stephens .................. B60K 1/04
2022/0123405 A1* 4/2022 Morishita ........... H01M 50/209
2022/0149458 A1* 5/2022 Jiang ................... H01M 10/657
2022/0149469 A1* 5/2022 Kim .................... H01M 50/244
2023/0061623 A1* 3/2023 Uemura ............ H01M 10/6551
2023/0327265 A1* 10/2023 Maguire ............. H01M 50/209 429/99
2023/0378549 A1* 11/2023 Golm .................. H01M 10/425
2023/0391177 A1* 12/2023 Kashiwagi ............... B60K 1/04
2024/0079627 A1* 3/2024 Reibling ............. H01M 50/204
2024/0243408 A1* 7/2024 Jiang ...................... B62D 21/11
2024/0326570 A1* 10/2024 Karlsson ............ B23K 20/1265
2024/0343103 A1* 10/2024 Yoon ........................ B60K 1/04
2024/0416765 A1* 12/2024 Zhang .................. B62D 21/157
2024/0429529 A1* 12/2024 Patscheider ......... H01M 50/209
2024/0429544 A1* 12/2024 Zhang ................. H01M 50/249
2025/0019021 A1* 1/2025 Becirbasic ............. B62D 21/10
2025/0096404 A1* 3/2025 Ahn .................... H01M 50/383
2025/0141008 A1* 5/2025 Cretin ................. H01M 50/519
2025/0192276 A1* 6/2025 He ...................... H01M 50/249
2025/0276568 A1* 9/2025 Balding ................... B60K 1/04
2026/0024867 A1* 1/2026 Popovski ............ H01M 50/204
2026/0042362 A1* 2/2026 Zhou ....................... B60L 50/64
2026/0051595 A1* 2/2026 Li ........................... B60K 1/04

FOREIGN PATENT DOCUMENTS

DE 10 2018 133 006 A1 6/2020
DE 10 2019 208 570 A1 12/2020
DE 20 2021 104 761 U1 9/2021
EP 2 468 609 A2 6/2012

OTHER PUBLICATIONS

German-language Written Opinion (PCT/ISA/237) issued in PCT Application No. PCT/EP2022/079853 dated Jun. 9, 2023 with English translation (8 pages).
German-language Search Report issued in German Application No. 10 2021 130 972.7 dated Aug. 18, 2022 with partial English translation (12 pages).

* cited by examiner

ENERGY STORAGE FLOOR ASSEMBLY FOR A MOTOR VEHICLE, IN PARTICULAR FOR A PASSENGER CAR, AND MOTOR VEHICLE

BACKGROUND AND SUMMARY

The invention relates to an energy storage floor assembly for a motor vehicle, in particular for a passenger car. The invention also relates to a motor vehicle, in particular a passenger car.

EP 2 468 609 A2 discloses a known energy-absorbing and energy-distributing side impact system for a vehicle, with a battery pack housing which is designed to hold a plurality of batteries.

The object of the present invention is to provide an energy storage floor assembly for a motor vehicle, and also a motor vehicle with such an energy storage floor assembly, such that a particularly space-saving and rigid attachment of an electrical energy store to a floor structure can be realized.

This object is achieved by an energy storage floor assembly and also by a motor vehicle with such an energy storage assembly in accordance with the independent claims. Advantageous refinements of the invention are the subject of the dependent claims.

A first aspect of the invention relates to an energy storage floor assembly for a motor vehicle, in particular for a passenger car. The energy storage floor assembly has a floor structure, which comprises interconnected longitudinal and cross members as bearer elements. This means that the floor structure has at least two longitudinal members. The longitudinal members are, for example, side sills. The longitudinal members are, for example, kept at a distance from one another in the transverse direction of the vehicle and extend substantially longitudinally in the longitudinal direction of the vehicle. In other words, in the installation position of the energy storage floor assembly, also referred to simply as the floor assembly, the longitudinal members are for example kept at a distance from one another in the transverse direction of the vehicle, the floor assembly assuming its installation position in the fully manufactured state of the motor vehicle equipped with the floor assembly. In this case the respective longitudinal member has a respective direction of longitudinal extent, which runs in the longitudinal direction of the vehicle, that is to say parallel to the longitudinal direction of the vehicle. The floor structure also has at least one cross member or a number of cross members. The cross member has a second direction of longitudinal extent, which preferably runs perpendicularly to the respective, first direction of longitudinal extent of the respective longitudinal member. In particular, in the installation position of the floor structure, the second direction of longitudinal extent of the cross member runs in the transverse direction of the vehicle, that is to say parallel to the transverse direction of the vehicle. The longitudinal and cross members are in particular interconnected in such a way that for example the cross member is connected to the longitudinal members, that is to say attached to the longitudinal members, in particular at both its ends, such that for example the longitudinal members are interconnected by way of the cross member. In particular, whenever the floor structure has a number of cross members, and consequently at least two, it is contemplated that, in the installation position of the floor assembly and consequently of the floor structure, the cross members are kept at a distance from one another in the longitudinal direction of the vehicle. In particular, the floor structure is for example a frame-like floor structure or body structure.

The floor structure is for example a component part of a body of the motor vehicle, also referred to as the bodyshell, the body preferably being formed as a self-supporting body. The body has the effect of delimiting an interior space of the motor vehicle, also referred to as the passenger cell or passenger compartment, persons such as for example a driver of the motor vehicle being able to occupy the interior space, in particular during a journey of the motor vehicle. It is consequently most preferably provided that the floor structure is a component part of the bodyshell. In this case it is contemplated that the body (bodyshell), and consequently the floor structure, are manufactured in a bodyshell production operation, the bodyshell production operation being carried out for example in a process for manufacturing the energy storage floor assembly or the body. In particular, it is contemplated that the respective longitudinal member and/or cross member is formed from a metal material, in particular from steel or else aluminum. The longitudinal members and the cross member or the cross members are also referred to together as bearer elements.

The energy storage floor assembly also has an electrical energy store, which is arranged on the underside of the floor structure and is connected to the floor structure. The feature that the electrical energy store is arranged on the underside of the floor structure should be understood as meaning in particular that, in the installation position of the energy storage floor assembly, the electrical energy store is at least partially, in particular at least predominantly and consequently by at least more than half or else completely, arranged below the floor structure, and consequently in particular below the bearer elements, in the vertical direction of the vehicle. As explained in further detail below, electrical energy can be stored or is stored by means of the electrical energy store. The electrical energy store has a store housing with an upper housing part, by which at least one intermediate space between at least two of the bearer elements is overlapped downwardly in the vertical direction of the vehicle and thereby closed. In other words, the bearer elements are arranged and interconnected in such a way that an intermediate space, also referred to as an intermediate compartment, is formed between at least two of the bearer elements. The at least two bearer elements are for example the longitudinal members, and so for example the intermediate space is arranged between the longitudinal members in the transverse direction of the vehicle, in particular in such a way that, in the transverse direction of the vehicle, the intermediate space is outwardly delimited on both sides by the longitudinal members, in particular in each case directly. It is also contemplated that, in the longitudinal direction of the vehicle, the intermediate space is arranged between the cross members kept at a distance from one another in the longitudinal direction of the vehicle, in particular in such a way that, in the longitudinal direction of the vehicle, the intermediate space is delimited on both sides by the cross members kept at a distance from one another in the longitudinal direction of the vehicle, in particular in each case directly. Since the upper housing part downwardly overlaps or covers, and thereby closes, the intermediate space in the vertical direction of the vehicle, the upper housing part is used as a floor panel of a floor, the interior space being downwardly delimited at least partially, in particular at least predominantly and consequently at least by more than half or else completely, in the vertical direction of the vehicle by the floor or the floor panel. For this purpose, it is for example provided that the upper housing part is formed at least in a partial region as a surface-covering element, and consequently as a panel, and has at least in a partial region an at least substantially two-dimensional extent. In this case it is provided in particular that, in the vertical direction of the vehicle, between the upper housing part and the bearer elements delimiting the intermediate space and/or between the upper housing part and the intermediate space there is no further floor panel formed separately from the floor structure and separately from the upper housing part by which the intermediate space is overlapped downwardly in the vertical direction of the vehicle.

In comparison with conventional bodies, the intermediate space in the energy storage floor assembly is consequently not closed (any longer) by floor panels, formed for example as floor plates, of a vehicle floor of the floor structure or of the body, but by the upper housing part of the store housing arranged on the underside of the floor structure. This allows the weight of the motor vehicle to be kept particularly low. For example, the upper housing part may be formed from a metal material, in particular steel or aluminum, such that for example the upper housing part is used as a floor panel formed as a floor plate in order to close the intermediate space.

For example, in the transverse direction of the vehicle, the longitudinal members are arranged at a first distance from one another, running in the transverse direction of the vehicle. It is also contemplated that, in the longitudinal direction of the vehicle, the cross members are arranged at a second distance from one another, running in the longitudinal direction of the vehicle. In this case it is contemplated that the intermediate space extends in the transverse direction of the vehicle at least over more than half of the first distance, in particular over the entire first distance, and/or the intermediate space extends in the longitudinal direction of the vehicle at least over more than half of the second distance or over the entire second distance. In this case it is preferably provided that the intermediate space is overlapped downwardly in the vertical direction of the vehicle at least predominantly and consequently at least by more than half or else completely by the upper housing part, and is consequently closed. As a result, a particularly lightweight construction can be provided. It is also contemplated that the intermediate space extends in the transverse direction of the vehicle at least over more than half of a width of the body extending in the transverse direction of the vehicle.

The electrical energy store also has storage cells for storing the electrical energy, in particular electrochemically. The storage cells are also referred to simply as cells and are individual cells, also referred to as single cells, by means of or in which the electrical energy can be stored or is stored, in particular electrochemically. In this case the storage cells are arranged in the store housing. The store housing has for example a receiving space, which is partially delimited by the upper housing part, in particular directly. In this case the storage cells are for example arranged in the store housing, and consequently in the receiving space, in such a way that the storage cells are surrounded on all sides by the store housing. For example, the storage cells are electrically interconnected such that a particularly great amount of electrical energy can be stored in the electrical energy store.

The electrical energy store is preferably a high-voltage component, the electrical voltage, in particular electrical operating and/or rated voltage, of which is preferably greater than 50 volts, in particular greater than 60 volts, and most preferably several hundred volts. As a result, particularly great electrical power outputs can be realized for electrically driving, in particular exclusively electrically driving, the motor vehicle designed for example as a hybrid or electric vehicle. Most preferably, the motor vehicle is designed as a battery electric vehicle (BEV).

In order thus to be able to realize a particularly space-saving and lightweight as well as particularly rigid attachment of the energy store to the floor structure, and as a consequence a particularly great rigidity of the energy storage floor assembly as a whole, it is provided according to the invention that the storage cells are prismatic storage cells, which are prismatic in their outer peripheral extent. First ones of the prismatic storage cells are arranged successively along a first stacking direction while forming a first cell module or a first row of cells. In the installation position of the floor assembly, for example the first stacking direction runs parallel to the longitudinal direction of the vehicle or else parallel to the transverse direction of the vehicle. Second ones of the prismatic storage cells are arranged successively along a second stacking direction, running parallel to the first stacking direction, while forming a second cell module or a second row of cells. Consequently, for example the second stacking direction runs parallel to the longitudinal direction of the vehicle or parallel to the transverse direction of the vehicle in the installation position of the floor assembly. The cell modules, also referred to as storage modules, are arranged next to one another along a direction of arrangement running perpendicularly to the stacking directions. The cell modules are also joined to one another, that is to say interconnected. As a result, the cell modules form a large cell module block, also referred to simply as a block or module block.

Furthermore, it is provided according to the invention that the first storage cells and the second storage cells, and therefore the cell module block, are or is joined to the upper housing part, in particular directly. As a result, the module block and the upper housing part form a particularly rigid composite construction, which, in particular by virtue of its attachment to the floor structure, provides a particularly great rigidity of the energy storage floor assembly. Since, in addition, there is no need for separate floor panels, formed for example as floor plates, for closing the intermediate space, or no such floor panels are provided, and therefore can be avoided, the number of parts, the installation space requirement and the costs of the energy storage floor assembly can therefore be kept particularly low. In addition, a storage capacity of the electrical energy store can be realized such that a particularly great amount of electrical energy can be stored in the energy store. The invention makes it possible to join the prismatic storage cells to form the cell modules and to integrate them in an available installation space without a module suspension.

Intermediate structures can be avoided, and so an available installation space can be advantageously used to position the energy store or the cells there. As a result, outer dimensions of the energy store can be kept small, while at the same time it is possible to realize a high storage capacity.

In order to be able to realize a particularly great rigidity of the composite construction mentioned, and consequently of the floor assembly as a whole, in a particularly lightweight and space-saving way, in an embodiment of the invention it is provided that the first storage cells and the second storage cells are adhesively bonded to the upper housing part and thereby joined to the upper housing part, in particular directly. In other words, the module block is adhesively bonded to the upper housing part and thereby joined to the upper housing part, in particular directly.

A further embodiment is distinguished by the fact that the respective, prismatic storage cell has a respective cell housing. In particular, the respective cell housing forms a respective outer skin of the respective storage cell, the outer skin of which is visually and haptically perceptible for a person in the vicinity of the storage cell. Since the respective storage cell is prismatic, the respective cell housing is prismatic in its outer peripheral extent. The respective cell housing has a respective housing bottom. The respective storage cell has connection elements, which are arranged on an upper side of the respective cell housing opposite from the respective housing bottom and are also referred to as terminals, by way of which the electrical energy stored in the respective storage cell can be provided by the respective storage cell. Consequently, the housing bottom is arranged on a respective underside of the respective cell housing. In other words, the housing bottom and the respective connection elements of the respective storage cell are arranged on respective sides of the respective cell housing lying opposite one another, the respective sides lying opposite one another adjacently along a respective direction of the cell housing. A first of the sides is the upper side, against or on which the connection elements are arranged. And the second side is the underside, on which or against which the housing bottom, also referred to simply as the bottom, is arranged.

In the installation position of the energy storage floor assembly, the direction of the cell housing runs for example parallel to the vertical direction of the vehicle. The respective cell housing has for example a respective cell housing space, in which in particular an electrolyte, in particular a liquid electrolyte, can be arranged. It is also contemplated that at least or exactly two electrodes of the respective storage cell are arranged in the cell housing space, the electrodes for example being immersed in the electrolyte or contacting the electrolyte. One of the first electrodes is for example electrically connected to a first of the connection elements, and the second electrode is for example electrically connected to the second connection element. It is also contemplated that the electrical energy provided by an energy source is fed into the respective storage cell by way of the connection elements and can in this way be stored in the respective storage cell. In this case it is contemplated in particular that, along the direction of the cell housing, the respective cell housing space is on one side delimited at least partially, in particular at least predominantly or completely, by the respective housing bottom, in particular directly.

In order to be able to realize a particularly great rigidity of the energy storage floor assembly in a particularly space-saving way, in a further refinement of the invention it is provided that the first storage cells and the second storage cells are joined to the upper housing part by way of their respective housing bottoms, the installation position of the energy storage floor assembly having the effect that the housing bottoms, and consequently the undersides of the storage cells, are facing upward in the vertical direction of the vehicle and the connection elements, and consequently the upper sides of the storage cells, are facing downward in the vertical direction of the vehicle. By way of the housing bottoms, the prismatic storage cells can be connected to the upper housing part over a particularly large area, and consequently particularly securely and rigidly, so as to be able to provide a particularly great rigidity.

In the process for manufacturing the energy storage floor assembly, it is provided for example that first the upper housing part is provided. In particular, the upper housing part is provided in such a way that an underside of the upper housing part faces upward in the vertical direction. After that, for example the storage cells are joined, in particular adhesively bonded, to the upper housing part, in particular by way of their housing bottoms, in particular to the underside of the upper housing part, in particular directly. In other words, for example the housing bottoms are joined, in particular adhesively bonded, to the upper housing part, in particular to the underside of the upper housing part, in particular directly. As a result, the upper housing part and the storage cells joined to it form the composite construction mentioned, which after the joining of the storage cells to the upper housing part is for example turned and connected to the floor structure in such a way that the underside of the upper housing part is facing away from the bearer elements. Consequently, in the installation position of the energy store, the underside of the upper housing part is facing downward in the vertical direction of the vehicle, and consequently away from the bearer elements, the energy store assuming its installation position in the fully manufactured state of the motor vehicle formed with the energy storage floor assembly. In this way, the energy storage floor assembly can be manufactured particularly easily.

A further embodiment is distinguished by the fact that the first storage cells are assigned a first bracing device, which has at least two first pressure plates and at least one first bracing element, which is connected at least to the first pressure plates, with at least a number of the first storage cells greater than one, in particular all of the first storage cells, being arranged between the first pressure plates along the first stacking direction. The first pressure plates are braced with respect to one another along the first stacking direction by means of the first bracing element by way of the first storage cells arranged between the first pressure plates, whereby the first storage cells, arranged between the first pressure plates, are braced with respect to one another along the first stacking direction and thereby held against one another.

The second storage cells are assigned a second bracing device, which has at least two second pressure plates and at least one second bracing element, which is connected at least to the second pressure plates. A number of the second storage cells greater than one, in particular all of the second storage cells, are arranged between the second pressure plates along the second stacking direction, which are braced with respect to one another along the second stacking direction by means of the second bracing element by way of the second storage cells arranged between the second pressure plates. As a result, the second storage cells, arranged between the second pressure plates, are braced with respect to one another along the second stacking direction and thereby held against one another.

The respective bracing element is preferably a respective tension element, which is also referred to as a tie rod. For example, the respective bracing element is connected in a material-bonding and/or form-fitting manner to the respective, associated pressure plates. In this case it is contemplated that the respective bracing element is adhesively bonded and/or welded to the associated pressure plates. In order to brace the storage cells, arranged between the respective pressure plates along the respective stacking direction, with respect to one another along the respective stacking direction by means of the respective bracing element, and consequently by means of the respective bracing device, and thereby hold them against one another, the respective bracing element is for example clamped or braced along the respective stacking direction, and so a force, in particular a tensile force, acts for example in the or by way of the respective bracing element, in particular tension element. The force, formed in particular as a tensile force, is transmitted by way of the respective bracing element from one of the respective pressure plates to the other pressure plate respectively, or vice versa, such that the pressure plates are pulled by means of the force, also referred to as a bracing force, along the stacking direction against or in the direction of the respective storage cells arranged between the respective pressure plates, and are consequently clamped against the respective storage cells. As a result, the respective storage cells, arranged between the respective pressure plates along the respective stacking direction, are pressed together along the respective stacking direction and are consequently held against one another. Since the force for bracing the respective storage cells, also referred to as the bracing force, acts in the respective bracing element or as a tensile force, the respective bracing element is for example subjected to tensile loading, in particular exclusively, and is therefore also referred to as a tie rod, and so the respective bracing device is for example also referred to as a tie rod system. As a result, a particularly secure and rigid cohesive strength between the respective storage cells can be realized, and so a particularly great rigidity can be provided.

It has in this case been found to be particularly advantageous if at least one of the first pressure plates is joined to at least one of the second pressure plates, whereby the cell modules are joined to one another. In particular, it is contemplated that the at least one first pressure plate is adhesively bonded and/or welded to the at least one second pressure plate. As a result, the cell modules are securely and rigidly interconnected by way of the pressure plates of the bracing devices, and so a great rigidity of the energy storage floor assembly as a whole can be provided.

A further, particularly advantageous embodiment provides that the first bracing element is joined to the second bracing element, whereby the cell modules are joined to one another. In other words, the cell modules are preferably joined to one another, that is to say are interconnected, by way of the bracing elements, whereby a particularly great strength and rigidity of the cell module block can be provided.

In order to realize a particularly great rigidity in a particularly lightweight and space-saving way, in a further refinement of the invention it is provided that the first bracing element is adhesively bonded and/or welded, and thereby connected, to the second bracing element.

A second aspect of the invention relates to a motor vehicle, preferably designed as a passenger car, which has an energy storage floor assembly according to the first aspect of the invention. Advantages and advantageous refinements of the first aspect of the invention should be considered to be advantages and advantageous refinements of the second aspect of the invention, and vice versa.

Further details of the invention emerge from the following description of a preferred exemplary embodiment and on the basis of the drawing.

In the figures, elements that are the same or functionally the same are provided with the same designations.

DETAILED DESCRIPTION OF THE DRAWINGS

Figure 1:
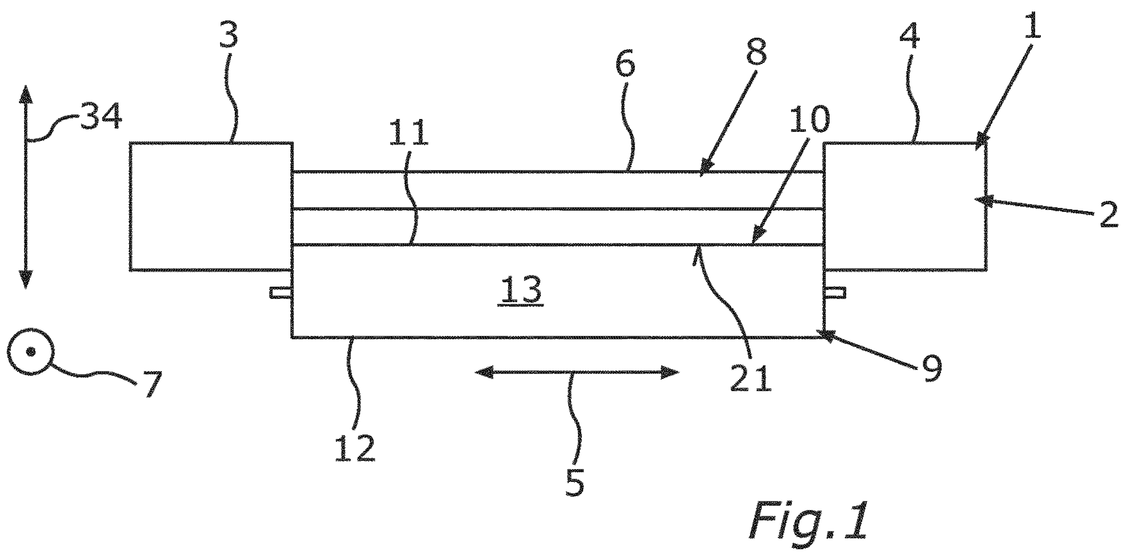
FIG. 1 is a schematic and sectional front view of an energy storage floor assembly for a motor vehicle, in particular for a passenger car.

FIG. 1 shows in a schematic and sectional front view an energy storage floor assembly 1, also referred to simply as a floor assembly, for a motor vehicle preferably designed as a passenger car. The energy storage floor assembly 1 has a floor structure 2, which comprises at least two longitudinal members 3 and 4. FIG. 1 shows the energy storage floor assembly 1 in an installation position of the energy storage floor assembly 1, the energy storage floor assembly 1 assuming its installation position in the fully manufactured state of the motor vehicle equipped with the energy storage floor assembly 1. The longitudinal members 3 and 4 are in this case kept at a distance from one another in the transverse direction of the vehicle, the transverse direction of the vehicle being illustrated by a double-headed arrow 5. The floor structure 2 also has at least one cross member 6, which is connected to the longitudinal members 3 and 4, in particular at both its ends. Consequently, the longitudinal members 3 and 4 are interconnected by way of the cross member 6. It is contemplated that the floor structure 2 has at least one further, second cross member, which is not shown in the figures. In this case it is contemplated that the cross members of the floor structure 2 are kept at a distance from one another in the longitudinal direction of the vehicle, the longitudinal direction of the vehicle being illustrated in FIG. 1 by a double-headed arrow 7 and running perpendicularly to the plane of the image of FIG. 1. The statements made above and below with respect to the cross member 6 can also be readily transferred to the other, second cross member, and vice versa. The longitudinal members 3 and 4 and the cross member 6 are also referred to together as bearer elements of the floor structure 2. The floor structure 2 itself, that is to say considered on its own, has an intermediate space 8, which is formed as a through-opening, which, in the transverse direction of the vehicle, is arranged between the longitudinal members 3 and 4 and in this case, in the transverse direction of the vehicle, is outwardly delimited on both sides by the respective longitudinal members 3 and 4, in particular in each case directly. It is also contemplated that, in the longitudinal direction of the vehicle, the intermediate space 8 is arranged between the cross members, in particular in such a way that, in the longitudinal direction of the vehicle, the intermediate space 8 is delimited on both sides by the respective cross members, in particular in each case directly. The intermediate space 8 is also referred to as a compartment or intermediate compartment and has a width running in the transverse direction of the vehicle and a length running in the longitudinal direction of the vehicle. The width corresponds for example to a first distance, running in the transverse direction of the vehicle, between the longitudinal members 3 and 4. The length corresponds for example to a second distance, running in the longitudinal direction of the vehicle, between the cross members. Consequently, the intermediate space 8 is arranged between the longitudinal members 3 and 4 and between the cross members.

In particular, the floor structure 2 is a component part of a body of the motor vehicle also referred to as the bodyshell and preferably formed as a self-supporting body, the body of the motor vehicle also being referred to as the superstructure. The body delimits an interior space of the motor vehicle also referred to as the passenger compartment or passenger cell, with persons, such as for example the driver of the motor vehicle, being able to occupy its interior space, for example during a journey of the motor vehicle.

Figure 3:
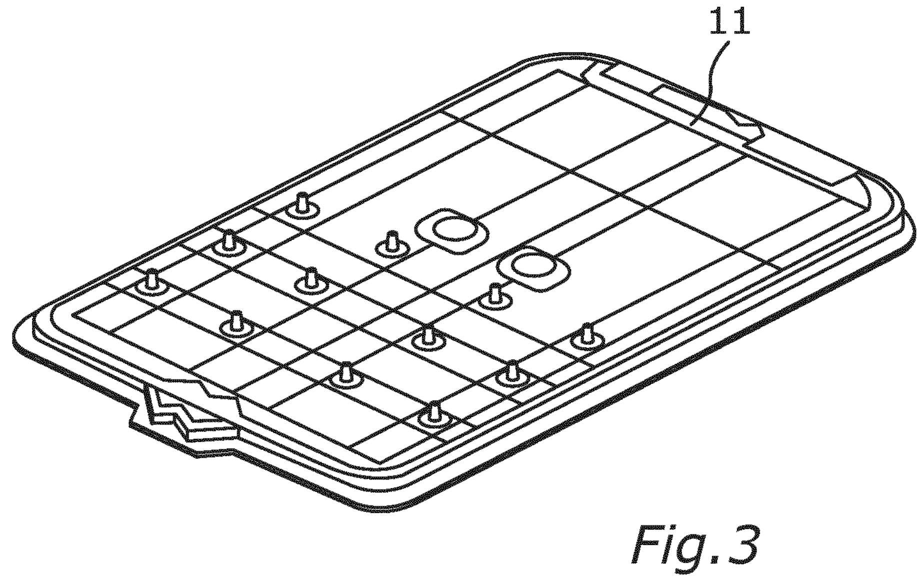
FIG. 3 is a schematic and perspective top view of an upper housing part of a store housing of the electrical energy store.
Figure 4:
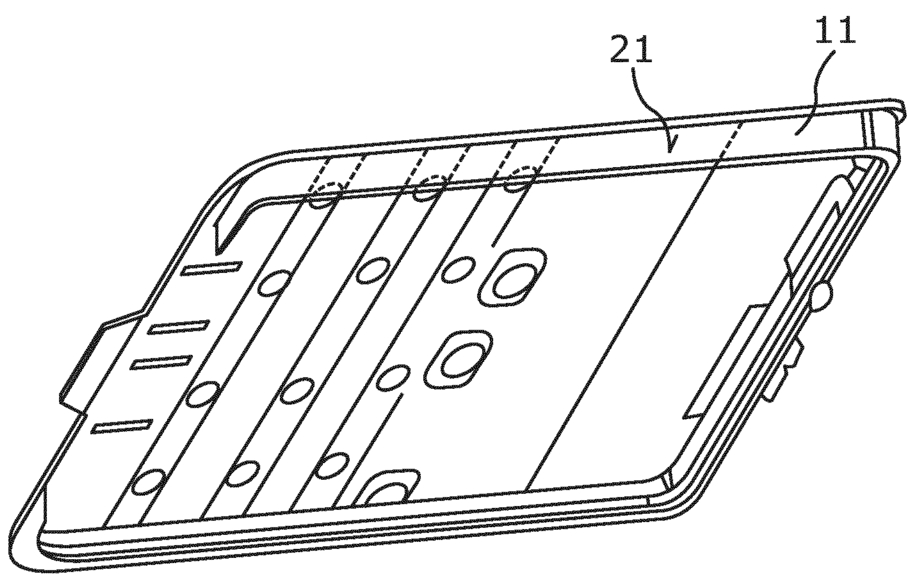
FIG. 4 is a schematic and perspective bottom view of the upper housing part.

The energy storage floor assembly 1 also has an electrical energy store 9, which is designed for example as a battery, in particular as a high-voltage battery (HV battery). It can be seen particularly well when FIGS. 3 and 4 are viewed together that the energy store 9 has a store housing 10, which has an upper housing part 11 as a first housing part and a lower housing part 12 as a second housing part. The housing parts of the store housing 10 are components that are formed separately from one another and interconnected. In the installation position of the energy store 9, the upper housing part 11 is arranged above the lower housing part 12 in the vertical direction of the vehicle, and so the lower housing part 12 is arranged below, and consequently on the underside of, the upper housing part 11 in the vertical direction of the vehicle. The energy store 9 assumes its installation position, which is shown in FIG. 1, in the fully manufactured state of the motor vehicle equipped with the floor assembly (energy storage floor assembly 1). It can be seen that the energy store 9 is arranged on the underside of the floor structure 2, and so the energy store 9 is arranged at least partially below the floor structure 2 in the vertical direction of the vehicle; in particular the energy store 9 is arranged below the cross member 6 in the vertical direction of the vehicle. Furthermore, the energy store 9 formed separately from the floor structure 2 is attached to the floor structure 2, and therefore connected to the floor structure 2 and consequently held against the floor structure 2.

The upper housing part 11 is used as a floor panel, formed for example as a floor plate, in that the intermediate space 8 between the bearer elements of the floor structure 2 is overlapped downwardly in the vertical direction of the vehicle, in particular completely, by the upper housing part 11, and is consequently covered and thereby closed. In the vertical direction of the vehicle, between the upper housing part 11 and the bearer elements delimiting the intermediate space 8 there is no further, additional floor element, whereby the number of parts, and consequently the costs, the weight and the installation space requirement, of the floor assembly can be kept particularly low.

The store housing 10 has a receiving space 13, which is delimited partially by the upper housing part 11 and partially by the lower housing part 12, in particular in each case directly. When viewed together with FIG. 5, it can be seen that the energy store 9 has storage cells 14, which are also referred to simply as cells. By means of the storage cells 14, electrical energy is stored or can be stored, in particular electrochemically. The storage cells 14 are in this case arranged, in particular completely, in the receiving space 13, and consequently in the store housing 10. It can be seen particularly well from FIG. 2 that the storage cells 14 are prismatic, and therefore are prismatic storage cells.

Figure 2:
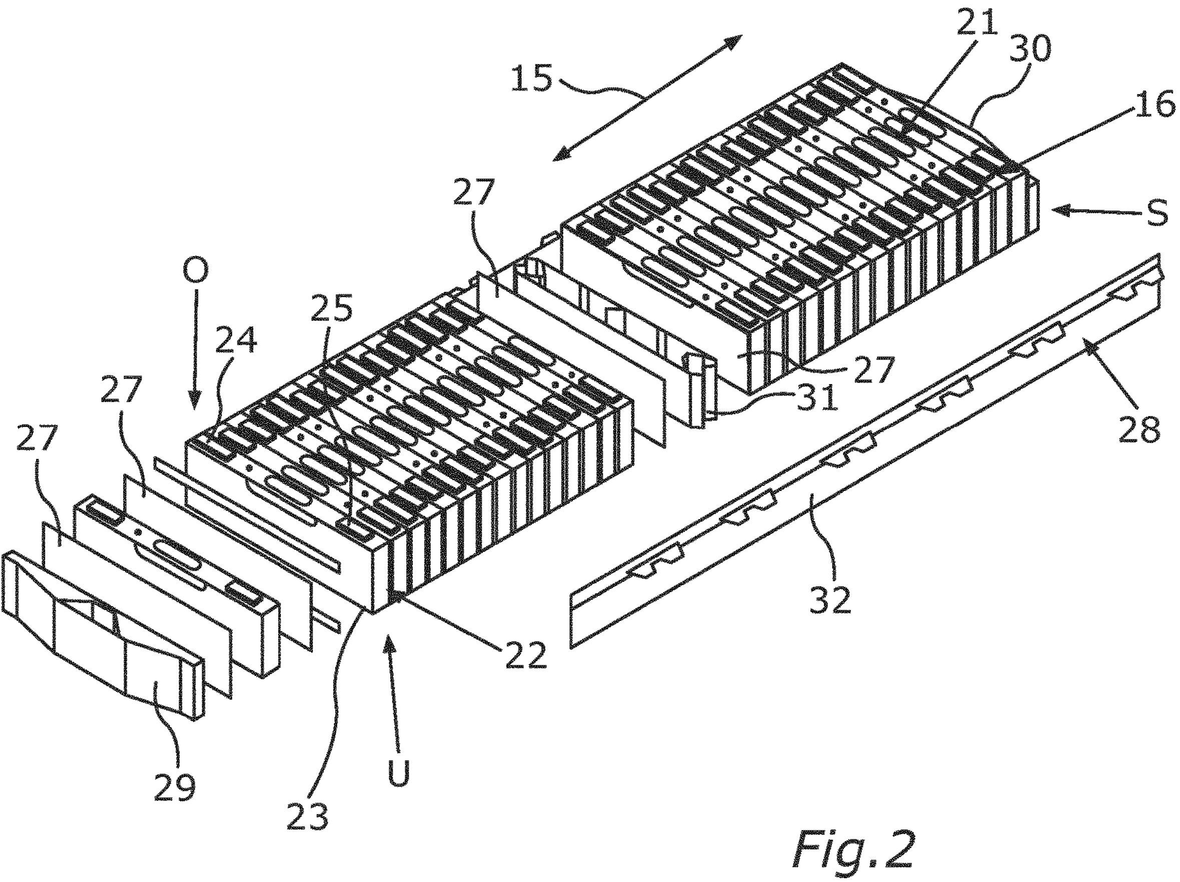
FIG. 2 is a schematic and perspective exploded view of a cell module of an electrical energy store of the energy storage floor assembly.
Figures 5, 6:
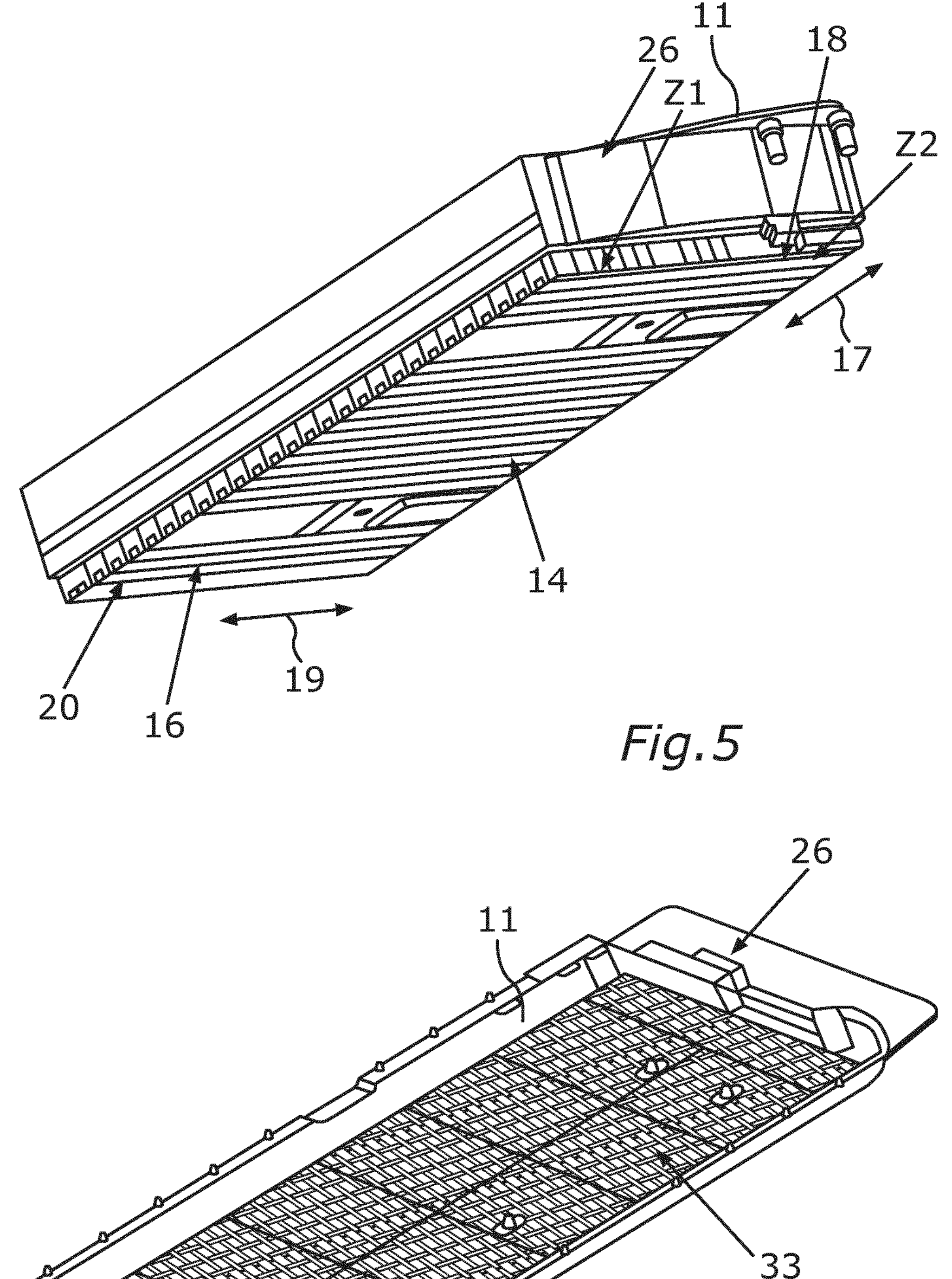
FIG. 5 is a schematic and perspective bottom view of a composite construction, which has the upper housing part and cell modules of the electrical energy store joined to the upper housing part.
FIG. 6 is a further schematic and perspective bottom view of the composite construction, wherein storage cells of the cell modules are joined to a supporting structure.

In order thus to be able to realize a particularly great rigidity of the energy storage floor assembly 1 in a particularly space-saving way, first ones of the storage cells 14, denoted in FIGS. 2 and 5 by Z1, are arranged successively, that is to say one behind the other, along a first stacking direction, illustrated by a double-headed arrow 15, while forming a first cell module 16. Second ones of the storage cells 14, denoted in FIG. 5 by Z2, are arranged successively, and consequently one behind the other, along a second stacking direction, running parallel to the first stacking direction and illustrated by a double-headed arrow 17, to be precise while forming a second cell module 18. The statements made above and below with respect to the first cells Z1 and with respect to the first cell module 16 can also be readily transferred to the second cells Z2 and the second cell module 18, and vice versa. It can be seen from FIG. 5 that the cell modules 16 and 18 are arranged next to one another along a direction of arrangement running perpendicularly to the stacking directions and illustrated in FIG. 5 by a double-headed arrow 19. Furthermore, the cell modules 16 and 18 are joined to one another, that is to say interconnected. As a result, the cell modules 16 and 18 form a particularly large and rigid module block 20, which is also referred to as a block or cell module block. The storage cells Z1 and Z2, and consequently the module block 20, are joined to the upper housing part 11, in particular to an underside 21 of the upper housing part 11. For example, the storage cells Z1 and Z2, and consequently the module block 20, are adhesively bonded to the underside 21 of the upper housing part, and therefore are attached to the underside 21 of the upper housing part and thereby joined to the upper housing part 11. It can be seen from FIG. 1 that, in the installation position of the energy store 9, and consequently of the floor structure 2 and of the energy storage floor assembly 1 as a whole, the underside 21 of the upper housing part is facing downward in the vertical direction of the vehicle, and is in this case facing away from the bearer elements, in particular from the cross member 6.

The respective storage cell 14, that is to say the respective, first storage cell Z1 and the respective, second storage cell Z2, has a respective cell housing 22, which can be seen particularly well from FIG. 2. On its respective underside U, the respective cell housing 22 has a respective housing bottom 23. Arranged on its respective upper side O, opposite from the respective underside U, of the respective cell housing 22 are respective connection elements 24 and 25, also referred to as terminals, of the respective storage cell 14. By way of the connection elements 24 and 25, the respective storage cell 14 can provide the electrical energy stored in it. The storage cells Z1 and Z2 are adhesively bonded to the underside 21 of the upper housing part, and consequently to the upper housing part 11, by way of their housing bottoms 23, and so, in the installation position of the energy storage floor assembly 1, the respective underside U is facing upward in the vertical direction of the vehicle and the respective upper side O, and consequently the connection elements 24, 25, is or are facing downward in the vertical direction of the vehicle. The joining of the storage cells Z1 and Z2, and consequently the module block 20, to the upper housing part 11 has the effect of creating a composite construction, which is denoted overall by 26 and comprises the upper housing part 11 and the module block 20 joined to it. The fact that the storage cells Z1 and Z2 are joined to the underside 21 of the upper housing part, and consequently to the upper housing part 11, by way of their respective housing bottoms 23 and the fact that the cell modules 16 and 18 are joined to one another mean that a particularly great rigidity of the composite construction 26 can be realized.

It can be seen from FIG. 2 that a spacing element 27 may be arranged between two of the storage cells Z1 respectively along the first stacking direction. The spacing element 27 may be a heat shield or a thermal barrier and comprise for example phyllosilicates. The respective spacing element 27 may also have spacing parts kept apart from one another in the vertical direction of the vehicle, while an intermediate region possibly containing air may be arranged in the vertical direction of the vehicle and between the spacing parts, and so in the intermediate region there is for example an air gap. It is also contemplated that an electrical insulation is arranged in the intermediate region. The spacing element 27 may comprise a coating or a main body wrapped in a film.

As can also be seen from FIG. 2 from the example of the storage cells Z1, the first storage cells Z1 are assigned a first bracing device 28. The first bracing device 28 has at least two first pressure plates 29 and 30. The bracing device 28 has at least one further, third pressure plate 31, which is arranged between the pressure plates 29 and 30, formed as end plates, along the first stacking direction, and consequently is also referred to as an intermediate pressure plate. Furthermore, the bracing device 28 has a first bracing element 32, which is also referred to as a first tie rod. The first storage cells Z1 are arranged between the pressure plates 29 and 30 along the first stacking direction, the pressure plate 31 being arranged between two of the first storage cells Z1 along the first stacking direction. Consequently, a number of the first storage cells Z1 greater than one are arranged between the pressure plates 29 and 30 along the first stacking direction. The bracing element 32 is connected to the pressure plates 29, 30 and 31, and so the pressure plates 29 and 30, 29 and 31 and 30 and 31 are braced with respect to one another along the first stacking direction by means of the bracing element 32 by way of the first storage cells Z1 arranged between the pressure plates 29, 30 and 31. As a result, the first storage cells Z1, arranged between the pressure plates 29, 30 and 31, are braced with respect to one another along the first stacking direction and thereby held against one another. It can be seen that the bracing element 32 is not arranged on the upper side O and is not arranged on the underside U, but instead the bracing element 32 is arranged against or on a side S of the respective storage cell Z1 different from the upper side O and the underside U, the side S facing outward in the transverse direction of the vehicle or in the longitudinal direction of the vehicle, and therefore facing in a direction which runs in a plane defined by the longitudinal direction of the vehicle and the transverse direction of the vehicle. In particular, it is contemplated that the bracing element 32 is adhesively bonded and/or welded to the pressure plates 29, 30 and 31 and thereby connected to the pressure plates 29, 30 and 31. It is also contemplated that the bracing element 32 is joined to the sides S, and consequently is joined by way of the sides S to the storage cells Z1, in particular in such a way that the bracing element 32 is adhesively bonded and/or welded to the sides S, and consequently to the storage cells Z1.

The sides S of the storage cells Z1 are facing the corresponding sides S of the storage cells Z2, and so the bracing elements of the bracing devices assigned to the cell modules 16 and 18 are arranged on mutually facing sides. In other words, the bracing elements of the bracing devices assigned to the cell modules 16 and 18 are arranged between the cell modules 16 and 18 along the direction of arrangement. In this case it is preferably provided that the bracing elements of the bracing devices assigned to the cell modules 16 and 18 are joined, in particular adhesively bonded and/or welded, to one another, in particular directly, and so the cell modules 16 and 18 are joined to one another, and consequently interconnected, by way of the bracing elements of the bracing devices.

It is alternatively or additionally contemplated that the pressure plates of the bracing device 28 assigned to the cell module 16 are connected, in particular adhesively bonded and/or welded, to the pressure plates of the bracing device assigned to the cell module 18, and so for example the cell modules 16 and 18 are joined to one another by way of the pressure plates of the bracing devices assigned to the cell modules 16 and 18. As a result, a particularly great rigidity can be provided.

It is contemplated that the upper housing part 11 shown in FIGS. 3 and 4 can be flowed through by a preferably liquid coolant. In other words it is contemplated that at least one cooling channel which can be flowed through by a coolant, in particular a liquid coolant, runs inside the upper housing part 11, and so the storage cells 14 can be cooled by way of the upper housing part 11 by means of the coolant flowing through the upper housing part 11. In this case it is contemplated that heat from the storage cells 14 passes over by way of their housing bottoms 23 to the upper housing part 11 and from the latter to the coolant flowing through the upper housing part 11, whereby the storage cells 14 can be effectively and efficiently cooled.

It can be seen from FIG. 6 that the energy storage floor assembly 1 may have a supporting structure 33. The supporting structure 33 is formed separately from the storage cells 14 and separately from the store housing 10 and has cutouts, for example at respective emergency degassing valves of the storage cells 14. The supporting structure 33 is preferably joined, in particular adhesively bonded and/or welded, to the cell housings 22 of the storage cells 14, in particular directly. It is also preferably provided that the supporting structure 33 is connected, and in this case for example adhesively bonded and/or welded, to the lower housing part 12, in particular directly, and so the storage cells 14, in particular the cell housings 22, can be connected to the lower housing part 12 by way of the supporting structure 33 as an intermediary element. It is in this case preferably provided that there is no direct connection between the storage cells 14 and the lower housing part 12. The connection of the storage cells 14 to the lower housing part 12 by way of the supporting structure 33 allows a particularly great rigidity to be realized. It is in this case contemplated in particular that the supporting structure 33 belongs to the composite construction 26.

LIST OF REFERENCE SIGNS

1 Energy storage floor assembly
2 Floor structure
3 Longitudinal member
4 Longitudinal member
5 Double-headed arrow
6 Cross member
7 Double-headed arrow
8 Intermediate space
9 Energy store
10 Store housing
11 Upper housing part
12 Lower housing part
13 Receiving space
14 Storage cells
15 Double-headed arrow
16 First cell module
17 Direction of arrangement
18 Second cell module
19 Double-headed arrow
20 Module block

21 Underside of the upper housing part
22 Cell housing
23 Housing bottom
24 Connection element
25 Connection element
26 Composite construction
27 Spacing element
28 Bracing device
29 Pressure plate
30 Pressure plate
31 Pressure plate
32 Bracing element
O Upper side
S Side
U Underside
Z1 First storage cells
Z2 Second storage cells

What is claimed is:

1. An energy storage floor assembly for a motor vehicle, comprising:

a floor structure comprising interconnected longitudinal and cross members as bearer elements; and an electrical energy store arranged on an underside of the floor structure and connected to the floor structure, the energy store having a store housing with an upper housing part, by which at least one intermediate space between at least two of the bearer elements is overlapped downwardly in a vertical direction of the vehicle and thereby closed, and having prismatic storage cells arranged in the store housing for storing electrical energy, wherein first ones of the prismatic storage cells are arranged successively along a first stacking direction while forming a first cell module, second ones of the prismatic storage cells are arranged successively along a second stacking direction, running parallel to the first stacking direction, while forming a second cell module, the first and second cell modules are arranged next to one another along a direction of arrangement running perpendicularly to the stacking directions and are joined to one another, the first and second ones of the storage cells are joined to the upper housing part, the first ones of the storage cells are assigned a first bracing device, which has at least two first pressure plates and at least one first bracing element, which is connected at least to the first pressure plates, at least a number of the first storage cells greater than one being arranged between the first pressure plates along the first stacking direction, which are braced with respect to one another along the first stacking direction by the first bracing element by way of the first storage cells arranged between the first pressure plates, whereby the first storage cells, arranged between the first pressure plates, are braced with respect to one another along the first stacking direction and thereby held against one another, and the second ones of the storage cells are assigned a second bracing device, which has at least two second pressure plates and at least one second bracing element, which is connected at least to the second pressure plates, at least a number of the second storage cells greater than one being arranged between the second pressure plates along the second stacking direction, which are braced with respect to one another along the second stacking direction by the second bracing element by way of the second storage cells arranged between the second pressure plates, whereby the second storage cells, arranged between the second pressure plates, are braced with respect to one another along the second stacking direction and thereby held against one another.

2. The energy storage floor assembly according to claim 1, wherein the first ones of the storage cells and the second one of the storage cells are adhesively bonded to the upper housing part to thereby be joined to the upper housing part.

3. The energy storage floor assembly according to claim 1, wherein each respective storage cell has connection elements and a respective cell housing with a respective housing bottom, which connection elements are arranged on an upper side of the respective cell housing, opposite from the respective housing bottom, and by way of which electrical energy stored in the respective storage cell is provided.

4. The energy storage floor assembly according to claim 1, wherein at least one of the first pressure plates is joined to at least one of the second pressure plates, whereby the cell modules are joined to one another.

5. The energy storage floor assembly according to claim 4, wherein the at least one first pressure plate is adhesively bonded and/or welded to the at least one second pressure plate.

6. The energy storage floor assembly according to claim 4, wherein the first bracing element is joined to the second bracing element, whereby the cell modules are joined to one another.

7. The energy storage floor assembly according to claim 6, wherein the first bracing element is welded and/or adhesively bonded to the second bracing element.

8. A motor vehicle comprising an energy storage floor assembly according to claim 1.

9. An energy storage floor assembly for a motor vehicle, comprising:

a floor structure comprising interconnected longitudinal and cross members as bearer elements; and an electrical energy store arranged on an underside of the floor structure and connected to the floor structure, the energy store having a store housing with an upper housing part, by which at least one intermediate space between at least two of the bearer elements is overlapped downwardly in a vertical direction of the vehicle and thereby closed, and having prismatic storage cells arranged in the store housing for storing electrical energy, wherein first ones of the prismatic storage cells are arranged successively along a first stacking direction while forming a first cell module, second ones of the prismatic storage cells are arranged successively along a second stacking direction, running parallel to the first stacking direction, while forming a second cell module, the first and second cell modules are arranged next to one another along a direction of arrangement running perpendicularly to the stacking directions and are joined to one another, the first and second ones of the storage cells are joined to the upper housing part, and the first ones of the storage cells and the second ones of the storage cells are joined to the upper housing part by way of their respective housing bottoms, whereby, in an installation position of the energy storage floor assembly, the housing bottoms are facing upward in the vertical direction of the vehicle and the connection elements are facing downward in the vertical direction of the vehicle.

10. A motor vehicle comprising an energy storage floor assembly according to claim 9.

* * * * *